United States Patent
Breidenstein

(10) Patent No.: US 7,920,831 B2
(45) Date of Patent: Apr. 5, 2011

(54) PTT/PTS SIGNALING IN AN INTERNET PROTOCOL NETWORK

(75) Inventor: Charles J. Breidenstein, Rochester, NY (US)

(73) Assignee: Redcom Laboratories, Inc., Victor, NY (US)

( * ) Notice: Subject to any disclaimer, the term of this patent is extended or adjusted under 35 U.S.C. 154(b) by 699 days.

(21) Appl. No.: 11/840,637

(22) Filed: Aug. 17, 2007

(65) Prior Publication Data

US 2008/0045258 A1 Feb. 21, 2008

Related U.S. Application Data

(60) Provisional application No. 60/838,282, filed on Aug. 17, 2006.

(51) Int. Cl.
*H04B 1/40* (2006.01)

(52) U.S. Cl. .......... 455/74; 455/458; 455/445; 455/466; 455/517; 455/518; 455/74.1; 455/552.1; 455/553.1; 709/230; 709/231; 709/232; 370/252; 370/465; 370/466; 370/467

(58) Field of Classification Search .................. 455/458, 455/11.1, 41.2, 517–520, 68–70, 552.1, 553.1, 455/445, 466, 74, 74.1; 370/252–253, 230, 370/235, 464–467; 709/230–232
See application file for complete search history.

(56) References Cited

U.S. PATENT DOCUMENTS

| | | | | |
|---|---|---|---|---|
| 5,163,158 A * | 11/1992 | Tendler et al. | ............... | 455/11.1 |
| 6,112,085 A * | 8/2000 | Garner et al. | ................. | 455/428 |
| 6,636,721 B2 * | 10/2003 | Threadgill et al. | ........... | 455/12.1 |
| 6,965,604 B1 * | 11/2005 | Sato et al. | ...................... | 370/401 |
| 7,310,596 B2 * | 12/2007 | Ota et al. | ...................... | 704/201 |
| 7,327,676 B2 * | 2/2008 | Teruhi et al. | .................. | 370/230 |
| 7,484,157 B2 * | 1/2009 | Park et al. | ..................... | 714/748 |
| 2001/0012775 A1 * | 8/2001 | Modzelesky et al. | ......... | 455/427 |
| 2003/0072269 A1 * | 4/2003 | Teruhi et al. | .................. | 370/252 |
| 2004/0196826 A1 | 10/2004 | Bao et al. | | |
| 2005/0190756 A1 * | 9/2005 | Mundra et al. | ................ | 370/389 |
| 2006/0053225 A1 * | 3/2006 | Poikselka et al. | ............ | 709/227 |
| 2006/0087982 A1 * | 4/2006 | Kuure et al. | ................... | 370/252 |

* cited by examiner

*Primary Examiner* — Tuan A Tran
(74) *Attorney, Agent, or Firm* — Thomas R. FitzGerald, Esq.; Hiscock & Barclay, LLP

(57) ABSTRACT

Conveying Push-To-Talk and Push-To-Signal (PTT/PTS) information over an IP network through signaling bits defined in and propagated with the Real-Time Protocol (RTP) stream allows the PTT/PTS information to remain synchronized with the voice packets of the stream. The maintenance of synchronization of PTT/PTS signals and voice packets eliminates problems arising from failure of synchronization between the two classes of packets, notably the "shoot/don't shoot" problem. The signaling bits employed were formerly used to convey legacy network information, but are no longer in active use in the Voice-over-IP (VoIP) realm, since VoIP provides alternative pathways for their information.

20 Claims, 1 Drawing Sheet

PTT/PTS SIGNALING IN AN INTERNET PROTOCOL NETWORK

RELATED APPLICATIONS

This patent claims the benefit of the filing date of U.S. Ser. No. 60/838,282 filed Aug. 17, 2006 whose entire contents are incorporated by reference.

FIELD OF THE INVENTION

The invention concerns the signaling of telephone call information in an Internet-protocol network, and more specifically the signaling of PTT/PTS (Push-To-Talk/Push-To-Signal) telephone call information in an Internet-protocol network.

BACKGROUND OF THE INVENTION

PTT/PTS is used in many government and military networks to control muting of a telephone handset's transmitter and to signal connected equipment such as radios that their transmitters are to be keyed (i.e., that their transmit functions are to be enabled) When a connection is established between a telephone having a PTT/PTS capability and a radio requiring transmit keying, the radio's transmit function will be turned on when the PTT button is depressed on the telephone, and turned off again when the PTT button is released. PTT reports the state of the phone's transmitter, and PTS requests keying of a remote transmitter. In practice in general usage, PTT and PTS often coincide.

In most existing communications networks such as TDM (Time Division Multiplex), transmission delays are minimal, and the PTT/PTS information can be carried in parallel with the voice using either CAS (Channel-Associated Signaling) or through a separate message-based interface such as ISDN PRI (Integrated Services Digital Network Primary Rate Interface). Since delays are small and predictable, this method of conveying the PTT/PTS information is satisfactory.

However, IP networks generally have higher delay (latency) and greater variability in latency than many conventional legacy networks. Unless steps are taken to prevent it, such networks are prone to what is commonly known as the "shoot/don't shoot" problem. Specifically, a PTT/PTS phone user depresses the PTT button on the handset and speaks the words "don't shoot", but the distant radio's transmitter is not keyed until the word "shoot" is received, so that only the word "shoot" is broadcast from the radio. This can happen if the PTT/PTS information experiences a greater delay through the IP network than the voice data does. Elimination of this problem in a Voice-over-Internet (VoIP) telephone system would constitute a significant advantage for such a system.

SUMMARY

The present invention conveys Push-To-Talk and Push-To-Signal (PTT/PTS) information over an IP network through the use of signaling bits formerly used to convey legacy network information. These signaling bits are no longer in active use in the Voice-over-IP (VoIP) realm, since their information is now carried through the VoIP network by other means. The signaling bits used are defined in and propagated with the Real-Time Protocol (RTP) stream, so that the PTT/PTS information remains synchronized with the voice packets of the stream. The maintenance of synchronization of PTT/PTS signals and voice packets eliminates problems arising from failure of synchronization between the two classes of packets, notably the "shoot/don't shoot" problem.

DETAILED DESCRIPTION OF THE INVENTION

Figure 1:
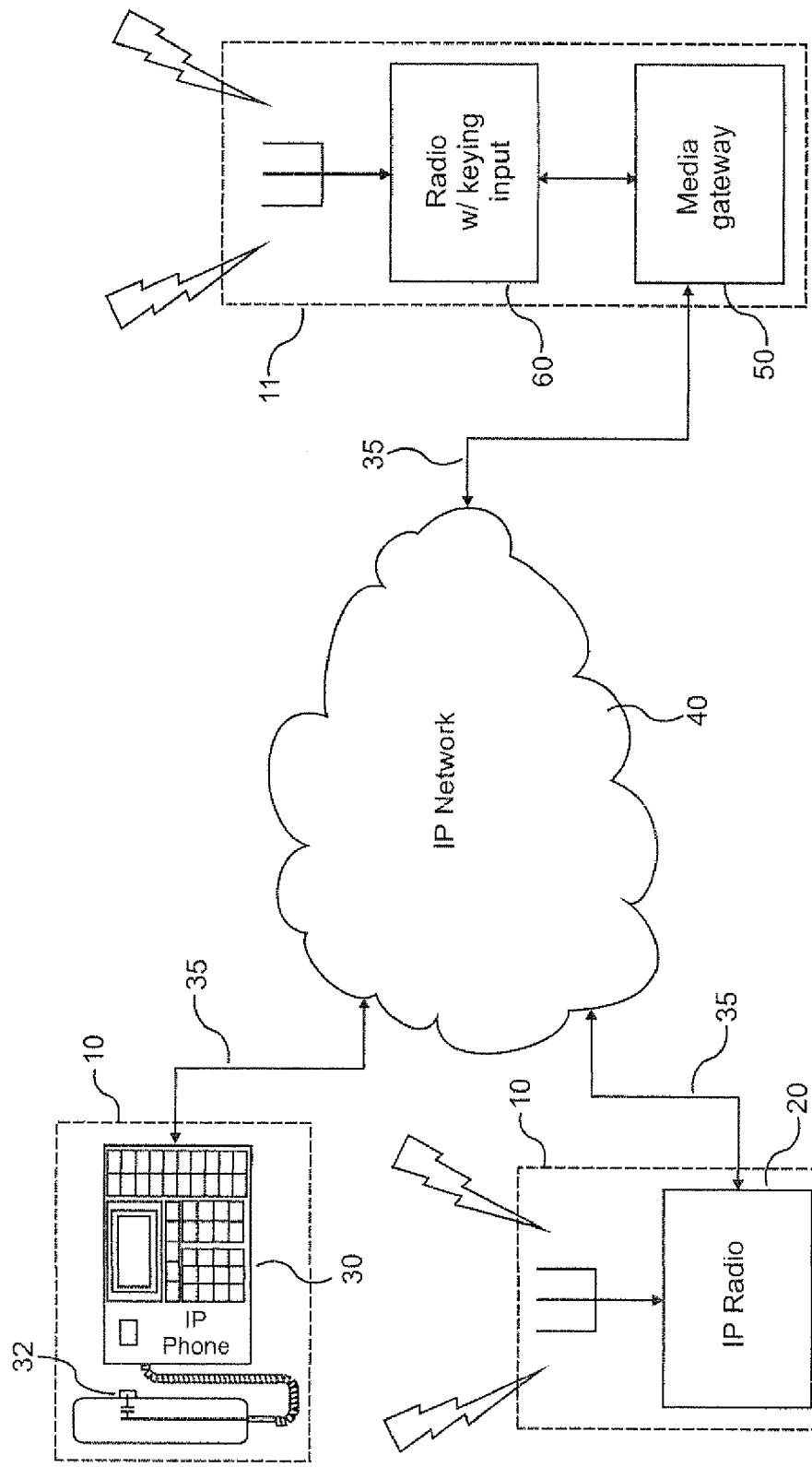
FIG. 1 shows the configuration of a PTT/PTS.

The Internet Engineering Task Force (IETF) RFC 2833 standard, incorporated herein by reference, defines a method for sending "telephone events" over the Real-Time Protocol (RTP) data stream. These are time-tagged in a manner similar to that of the voice packets, and are used, for example, for reliable transmission of Dual-Tone-Multi-Frequency (DTMF) signals end-to-end over an Internet Protocol (IP) network during an established call. Although the RFC 2833 standard does not include a method for sending PTT/PTS signals specifically, it does define sending four independent signaling bits termed the "ABCD bits". The original purpose of the ABCD bits was to relay the ABCD supervisory bits of legacy T1 and E1 transmission systems, but in the evolving IP networks, these signals are no longer needed since in most cases call setup and teardown are handled by special messages in the call management protocol. For example, call answer and disconnect are handled in the IP's Session Initiation Protocol (SIP) by the "200 OK" and "BYE" methods respectively.

The fact that the ABCD bits are passed end-to-end in the RTP stream via the RFC 2833 mechanism means that they suffer exactly the same latency (delays) as the voice packets. This latency synchronization is important, because the "shoot/don't shoot" problem is due to the differential latency between the PTT/PTS information and the voice information. Since the two latencies are equal for both voice packets and the ABCD bits, the differential latency is zero, and consequently ABCD bits remain in the same real-time relationship to the voice packets at both ends of the call. If the PTT/PTS information were passed via the usual call control messages, additional PTT/PTS processing delays would be expected, and both the packet routing and packet priority would be expected to differ from those of the RTP stream. In that event, the differential latency would not be zero, and the required synchronization would not be obtained.

The present invention therefore uses the now-available ABCD bits to transmit a call's PTT and PTS signals with exact synchronization with the voice packets also in the RTP stream. In a basic embodiment of the present invention, one of the ABCD bits is used to transmit the PTT signal, and another ABCD bit is used to transmit the PTS signal. Since there are four bits available (A, B, C, and D each provide one bit), and only two signals to be sent (PTT and PTS), an acknowledgement embodiment of the invention provides for use of the remaining two bits for acknowledgement signals returned to the source of the PTT/PTS signals.

See FIG. 1. The present invention comprises one or more communication terminals 10, one or more communication terminals 11, and an IP routing network 40 connected to each terminal 10, 111 via a link 35. Each communication terminal 10 may comprise an IP radio 20, an IP telephone 30, or any other type of IP device capable of PTT/PTS signaling. In FIG. 1, IP telephone 30 is shown with a PTT/PTS switch 32 provided on its handset. Communication terminal 11 may comprise a media gateway 50 and a radio 60 having keying input (i.e., input controlled by a microphone key or switch, not shown here).

A call between IP phone 30 and communication terminal 11 illustrates the working of the invention. When activated during the call, PTT/PTS switch 32 of IPtelephone 30 generates a PTT bit activation in a Real-Time Protocol (RTP) packet stream directed to the radio 60 of communication terminal 11. RTP is not involved in the setting up or tearing down of the link. That is done by another protocol (SIP) that is not relevant to this invention. Each RTP packet stream has a number of legacy bits, termed ABCD bits. These bits were included in the RFC 2833 standard to control T1 and E1 line channel-associated signaling transmissions over the Internet. Since equipment using push to talk and push to signal features generates no T1 and E1 line channel-associated signaling, the equipment 10, 11 and 20 uses the legacy ABCD bits to provide push to talk and push to signal control bits.

The radio 60 of communication terminal 11 detects the PTT bit activation generated by PTT/PTS switch 32, and initiates one or more actions appropriate for PTT signaling as a result. In an acknowledgement embodiment of the invention, radio 60 generates a PTT-acknowledgement bit activation in a return RTP packet stream directed to IP phone 30. This series of actions comprises a PTT communication sequence.

In like manner, when activated during the call, PTT/PTS switch 32 of IP telephone 30 generates a PTS bit activation in a Real-Time Protocol (RTP) packet stream directed to the radio 60 of communication terminal 11. The radio 60 of communication terminal 11 detects the PTS bit activation generated by PTT/PTS switch 32, and initiates one or more actions appropriate for PTS signaling as a result. In an acknowledgement embodiment of the invention, radio 60 generates a PTS-acknowledgement bit activation in a return RTP packet stream directed to IP phone 30. This series of actions comprises a PTS communication sequence.

The following assignment of bits to functions in the present invention is provided for illustrative purposes, and should not be taken in any limiting sense. In the illustrative embodiment, bit A in the outgoing RTP stream reflects the PTT status of the local device (the source of the outgoing stream. Optionally, on receipt of bit A from a remote device, a local device may acknowledge receipt by setting bit B in its own outgoing stream returning to the remote device. Similarly, bit C in the outgoing RTP stream reflects the PTS status of the local device. Optionally, on receipt of bit C from a remote device, a local device may acknowledge receipt by setting bit D in its own outgoing stream returning to the remote device.

The following table summarizes the assignment of ABCD bits to functions described in the previous paragraph:

Bit Usage
A Source device's PTT signal
B Receiving device's receipt status of PTT signal from source device
C Source device's PTS signal
D Receiving device's receipt status of PTS signal from source device Through the use of the ABCD bits, the invention synchronizes the PTT/PTS signaling of a call with the voice packets of the same call in the RTP packet stream, thereby eliminating communication problems created by the loss of said synchronization.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. An Internet-protocol-based telecommunications network comprising:
   an Internet protocol routing network;
   one or more Internet-protocol communication terminals connected to the Internet protocol routing network;
   one or more communication terminals connected to the Internet protocol routing network;
   a push-to-talk signaling means connected to each Internet-protocol communication terminal;
   means for converting a push-to-talk signal in said Internet-protocol communication terminal to a first bit activation in a Real-Time Protocol packet stream;
   means for converting said first bit activation in said Real-Time Protocol packet stream to said push-to-talk signal in said communication terminal;
   means for initiating actions based on said push-to-talk signal in said communication terminal.

2. The telecommunications network of claim 1 further comprising:
   a push-to-talk acknowledgement signaling means connected to each communication terminal;
   means for converting a push-to-talk acknowledgement signal in said communication terminal to a second bit activation in a Real-Time Protocol packet stream;
   means for converting said second bit activation in said Real-Time Protocol packet stream to said push-to-talk acknowledgement signal in said Internet-protocol communication terminal.

3. The telecommunications network of claim 1 further comprising:
   a push-to-send signaling means connected to each Internet-protocol communication terminal;
   means for converting a push-to-send signal in said Internet-protocol communication terminal to a third bit activation in a Real-Time Protocol packet stream;
   means for converting said third bit activation in said Real-Time Protocol packet stream to said push-to-send signal in said communication terminal;
   means for initiating actions based on said push-to-send signal in said communication terminal.

4. The telecommunications network of claim 3 further comprising:
   a push-to-send acknowledgement signaling means connected to each communication terminal;
   means for converting a push-to-send acknowledgement signal in said communication terminal to a fourth bit activation in a Real-Time Protocol packet stream;
   means for converting said fourth bit activation in said Real-Time Protocol packet stream to said push-to-send acknowledgement signal in said Internet-protocol communication terminal.

5. The telecommunications network of claim 1 wherein the Real Time Protocol packet stream is sent and received in accordance with a legacy standard comprising tone control bits containing push-to-talk and push-to-send data.

6. The telecommunications network of claim 1 wherein the Real Time Protocol packet stream is sent and received in accordance with Internet Request For Comments Standard 2833 or its equivalent and uses tone control bits to control push-to-talk and push-to-send operations.

7. The telecommunications network of claim 1 wherein the communications terminal is one of the group consisting of an IP radio, an IP telephone, or an IP device with PTT/PTS signaling.

8. A method for relaying control signals between communication terminals in an Internet-protocol-based telecommunications network comprising the steps of:
converting a first control signal at an Internet-protocol communication terminal to a first bit activation in a Real-Time Protocol packet stream;
transmitting said first bit activation in a Real-Time Protocol packet stream over the Internet-protocol-based telecommunications network from the Internet-protocol communication terminal to a communication terminal; and
converting said first bit activation in a Real-Time Protocol packet stream back to said first control signal at the communication terminal.

9. The method of claim 8 wherein the step of converting a first control signal at an Internet-protocol communication terminal to a first bit activation in a Real-Time Protocol packet stream comprises the step of converting a push-to-talk signal at an Internet-protocol communication terminal to a first bit activation in a Real-Time Protocol packet stream.

10. The method of claim 8 wherein the step of converting said first bit activation in a Real-Time Protocol packet stream back to said first control signal at the communication terminal comprises the step of converting said first bit activation in a Real-Time Protocol packet stream back to a push-to-talk signal at the communication terminal.

11. The method of claim 8 wherein the step of converting a first control signal at an Internet-protocol communication terminal to a first bit activation in a Real-Time Protocol packet stream comprises the step of converting a push-to-send signal at an Internet-protocol communication terminal to a first bit activation in a Real-Time Protocol packet stream.

12. The method of claim 8 wherein the step of converting said first bit activation in a Real-Time Protocol packet stream back to said first control signal at the communication terminal comprises the step of converting said first bit activation in a Real-Time Protocol packet stream back to a push-to-send signal at the communication terminal.

13. The method of claim 8 further comprising the steps of:
converting a first control signal acknowledgement at a communication terminal to a second bit activation in a second Real-Time Protocol packet stream;
transmitting said second bit activation in the second Real-Time Protocol packet stream over the Internet-protocol-based telecommunications network from the communication terminal to the Internet-protocol communication terminal; and
converting said second bit activation in the second Real-Time Protocol packet stream back to said first control signal acknowledgement at the Internet-protocol communication terminal.

14. The method of claim 8 wherein the step of converting a first control signal acknowledgement at a communication terminal to a second bit activation in a second Real-Time Protocol packet stream comprises the step of converting a push-to-talk signal acknowledgement at a communication terminal to a second bit activation in a second Real-Time Protocol packet stream.

15. The method of claim 8 wherein the step of converting said second bit activation in the second Real-Time Protocol packet stream back to said first control signal acknowledgement at the Internet-protocol communication terminal comprises the step of converting said second bit activation in the second Real-Time Protocol packet stream back to a push-to-talk signal acknowledgement at the Internet-protocol communication terminal.

16. The method of claim 8 wherein the step of converting a first control signal acknowledgement at a communication terminal to a second bit activation in a second Real-Time Protocol packet stream comprises the step of converting a push-to-send signal acknowledgement at a communication terminal to a second bit activation in a second Real-Time Protocol packet stream.

17. The method of claim 8 wherein the step of converting said second bit activation in the second Real-Time Protocol packet stream back to said first control signal acknowledgement at the Internet-protocol communication terminal comprises the step of converting said second bit activation in the second Real-Time Protocol packet stream back to a push-to-send signal acknowledgement at the Internet-protocol communication terminal.

18. The method of claim 17 wherein the Real Time Protocol packet stream is sent and received in accordance with a legacy standard comprising tone control bits containing push-to-talk and push-to-send data.

19. The method of claim 8 wherein the Real Time Protocol packet stream is sent and received in accordance with Internet Request For Comments Standard 2833 or its equivalent and uses tone control bits to control push-to-talk and push-to-send operations.

20. The method of claim 8 wherein the communications terminal is one of the group consisting of an IP radio, an IP telephone, or an IP device with PTT/PTS signaling.

* * * * *